United States Patent [19]
Lowrance

[11] 3,798,971
[45] Mar. 26, 1974

[54] TEMPERATURE DIFFERENTIAL SENSOR FOR GLIDERS

[75] Inventor: Carl J. Lowrance, Tulsa, Okla.

[73] Assignee: Lowrence Electronics Mfg. Corp., Tulsa, Okla.

[22] Filed: Nov. 1, 1971

[21] Appl. No.: 194,395

[52] U.S. Cl. .................................. 73/342, 244/16
[51] Int. Cl. ............................................ G01k 7/22
[58] Field of Search .. 73/342, 340; 340/283, 277 D, 340/228 S; 244/16, 134 R; 317/155.5

[56] References Cited
UNITED STATES PATENTS

| | | | |
|---|---|---|---|
| 3,258,757 | 6/1966 | Burwood | 340/283 X |
| 3,295,353 | 1/1967 | Hagen | 73/342 X |
| 2,711,650 | 6/1955 | Weisheit | 340/227 D |
| 2,236,891 | 4/1941 | Bridges | 340/227 D |
| 2,587,762 | 3/1952 | Reece | 340/227 D |
| 2,886,768 | 5/1959 | Minder | 317/155.5 X |

FOREIGN PATENTS OR APPLICATIONS
64,197 12/1945 Denmark .............................. 244/16

Primary Examiner—Richard C. Queisser
Assistant Examiner—Daniel M. Yasich
Attorney, Agent, or Firm—Head & Johnson

[57] ABSTRACT

An apparatus for mounting in a glider, including a first air temperature sensor positioned adjacent one point on the perimeter of the glider, such as the tip of the of the glider left wing, an air temperature sensor positioned adjacent a second point on the perimeter of the glider, such as the tip of the glider right wing, and a temperature differential indicating means mounted in the glider cockpit in view of the pilot, the differential indicating means being connected to the air temperature sensors and including means for indicating difference in temperature detected by the sensors, thereby indicating to the pilot the direction towards warm air currents when a temperature differential exists.

6 Claims, 4 Drawing Figures

PATENTED MAR 26 1974　　　　　　　　　　　　　　　　　3,798,971
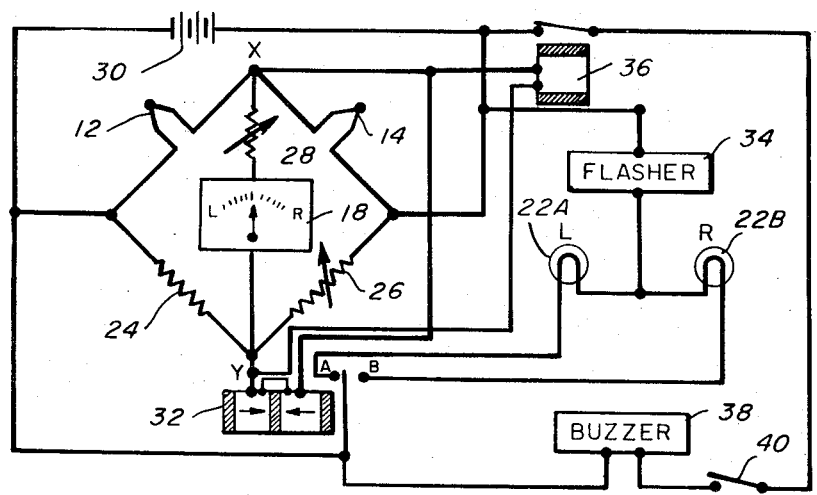
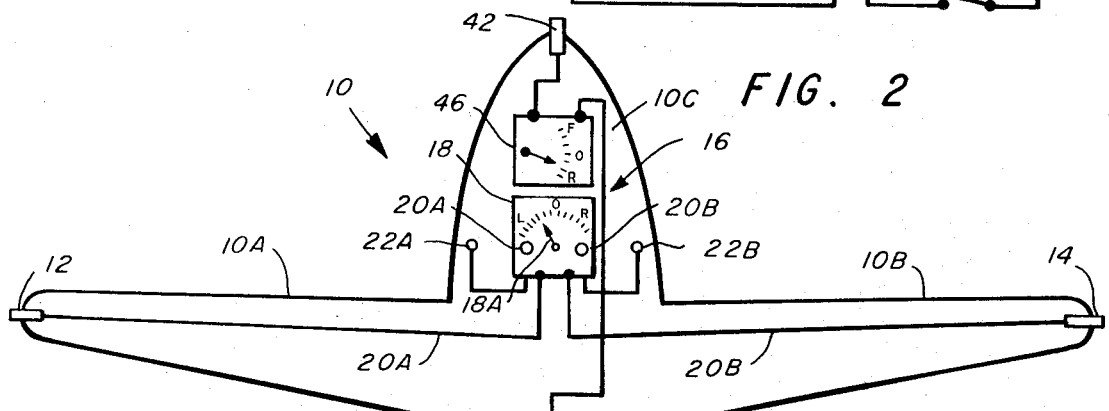
FIG. 2
FIG. 1
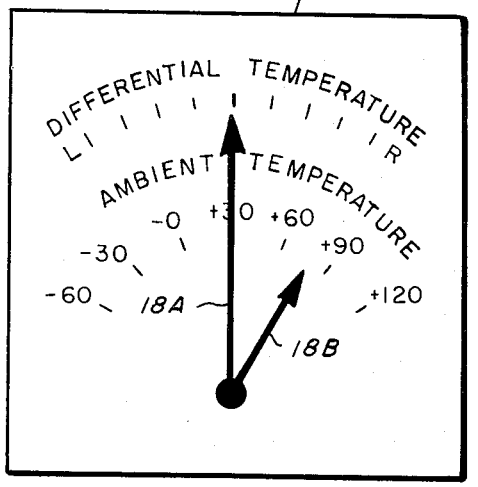
FIG. 3
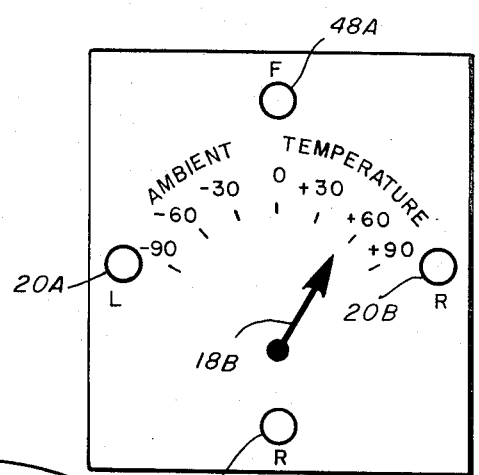
FIG. 4

TEMPERATURE DIFFERENTIAL SENSOR FOR GLIDERS

BACKGROUND, SUMMARY AND OBJECTS OF THE INVENTION

A popular sport is that of gliding. Gliders which are motorless aircraft, soaring planes, and said planes, are constructed to have a relatively large wing spread in proportion to weight. Gliders are usually propelled into the air by a cable attached to a power-driven airplane. In some instances, gliders can be launched by pulling them with a cable attached to a land vehicle. Means is provided of releasing the cable when the desired altitude is obtained.

Since gliders are without engines, the length of flight is governed by the efficient utilization rising air currents. While rising air currents may be developed in a variety of ways, such as by wind passing over hills and mountains, a most frequent type of rising air current is caused by heating of the air by the sun's energy. Certain earth surface features tend to heat more rapidly than others in response to sunlight. The heated air rises in the cooler surrounding air. Such rising heated air is called a "thermal."

In piloting a glider, the pilot must learn to locate thermals such as by observing areas where they are likely to occur. To gain altitude the pilot must enter the thermal and circle the glider while the upwardly moving column of air carries the glider to higher elevations.

It is therefore important that a glider pilot be able to determine the direction in which the glider must move in order to take advantage of a thermal and to know when he is entering or leaving a thermal. In addition when the glider pilot reaches the maximum desired altitude in a thermal, it is important to be able to ascertain the direction of turn most likely to take the glider out of the thermal.

This invention provides a means for indicating to a pilot the existance of an air temperature differential and the direction towards warm air.

More particularly, this invention provides means of indicating the relative air temperature to the right and left and/or to the front and rear of a glider.

It is therefore an object of this invention to provide an apparatus for mounting in a glider for indicating air temperature differential to the right and left and/or the front and rear of the glider.

More particularly, an object of this invention is to provide an apparatus for mounting in a glider including means for detecting the temperature at one point on the perimeter of the glider, such as at the right wing tip, and the temperature at another point on the perimeter of the glider opposite the first, such as at the left wing tip, and for indicating the temperature differential as a means of indicating the direction towards warmer air.

Still more particularly, an object of this invention is to provide an apparatus for mounting in a glider including spaced-apart air temperature sensors positioned at opposed points on the outer periphery of the glider, including improved meeans of indicating to the glider pilot the direction towards warmer air.

These and other objects will be fulfilled in the following description and claims, taken in conjunction with the attached drawings.

DESCRIPTION OF VIEWS

FIG. 1 is a diagrammatic plan view of a glider showing the apparatus of this invention for indicating temperature differential.

FIG. 2 is a schematic diagram of one circuit arrangement which may be employed in practicing the invention. Either an indicating instrument or lights may be used to indicate the existence of a temperature differential and the direction towards warmer air.

FIG. 3 is a view of an instrument face which may be utilized in the invention for indicating both the differential temperature and ambient air temperature.

FIG. 4 is a view of one type of instrument panel for use with the invention including means of indicating temperature differential fore and aft, and right and left, as well as ambient temperature.

DETAILED DESCRIPTION

Referring to the drawings, and first to FIG. 1, a glider plane is indicated generally by numeral 10. The invention includes means to enable the pilot of glider 10 to detect the existence of temperature differentials in the air through which the glider passes and to know the direction towards the warmest air temperature as an indication of the direction at which rising air currents will most likely be found. The apparatus includes a left air temperature sensor 12 mounted at the tip of the glider left wing 10A and a right air temperature sensor 14 mounted at the tip of the glider right wing 10B. The air temperature sensors 12 and 14 may be any type of device responding electrically to detect air temperatures. A thermistor is of good example of a temperature detecting device which functions for the intended purpose.

Positioned in the cockpit area 10C of the glider is a temperature differential indicating measns generally indicated by the numeral 16. In the arrangement of FIG. 1, the temperature differential indicating means includes an indicating instrument 18, which is connected by conductors 20A and 20B to the left temperature sensor 12 and the right temperature sensor 14 respectively. Pointer 18A on instrument 18 moves to indicate a temperature differential and, in the illustrated arrangement, is pointing to the left of center, indicating that warmer air temperature is detected by sensor 12 compared to the temperature of the air detected by sensor 14. This means that if the glider pilot observing instrument 18 is seeking warm air currents which rise relative to the surrounding cool air and therefore afford opportunity for lifting the glider to high altitudes, he would turn the glider to the left.

In addition to the indicating instrument 18, the differential indicating means 16 may include other arrangements. For instance, a left indicating light 20A and a right indicating light 20B may be mounted as part of the instrument 18 so that the left light 20A comes on when the air temperature detected by sensor 12 is lower than that detected by sensor 14 and correspondingly the right light 20B comes on when the right sensor 14 detects lower air temperature. The lights may be mounted on instrument 18 or elsewhere in the cockpit, illustrated by lights 22A and 22B. The lights may be used with or without instrument 18.

Referring to FIG. 2, a circuit diagram, illustrative of one means practicing the invention is shown, it being understood that many other circuit arrangements may be utilized, all within the invention. Sensors 12 and 14, in the form of thermistors which vary in resistance according to temperature, are mounted in a bridge circuit. The bridge circuit includes a resistor 24 and a variable resistor 26. Instrument 18 is placed across points X and Y of the bridge and includes, in series, a variable resistor 28 which may be utilized to select the sensitivity of instrument 18. A battery 30 is connected to the bridge at the points opposite instrument 18. The direction of current flow through instrument 18 will depend upon the balance of the bridge. Variable resistor 26 is used to balance the bridge when the air temperature to which the sensors 12 and 14 are exposed are the same. With the bridge balanced no current flows through instrument 18. When the resistance of one of the sensors 12 or 14 varies relative to the other in response to a temperature differential, the bridge becomes unbalanced and current flows through instrument 18 in one direction or the other depending upon which of the sensors reflect a higher resistance than the other. Amplifying menas may be added as required to increase the sensitivity of instrument 18 to respond to minute temperature differentials.

As previously mentioned, other means besides instrument 18 may be utilized to indicate a detected temperature differential. As an example, differential relay 32 is positioned across points X and Y of the bridge. The relay responds to unbalance of the bridge to provide electrical continuity with point A or B, and thereby to illuminate light 22A or 22B depending upon the direction of the unbalance of the bridge. To more effectively call attention of the pilot to a temperature differential, a flasher 34 may be added in series with lights 22A and 22B. As previously stated, the lights 22A and 22B may be mounted as part of indicating instrument 18 or elsewhere in the glider cockpit, and the lights may be used with or without instrument 18.

Flasher 34 may be arranged to flash at varying rates, depending upon the degree of temperature differential detected, that is, it may be arranged to flash rapidly when a high degree of temperature differential is detected, and more slowly when a lesser temperature differential is detected.

Another alternate embodiment includes the provision of an audio signal when a temperature differential is detected. A relay 36 across points X and Y of the bridge is energized when a temperature differential in either direction occurs. Relay 36 connects a buzzer 38 across battery 30 to provide an audio indication that a temperature differential exists. Thus, the pilot would not need to continually visually monitor the indicating means 16, but would have is attention called to the fact that a temperature differential has been detected by buzzer 38. A switch 40 may be utilized by the pilot to disconnect buzzer 38 if its use is not desired.

Many different circuit arrangements may be utilized other than that of FIG. 2 to practice the invention. Obviously, solid state devices may be employed in place of relays 32 and 36 and various other circuit changes may be made for increased sensitivity, all within the scope of any competent electrical engineer.

FIG. 3 shows another embodiment of the invention. Instrument 18 includes dual pointers. First pointer 18A indicates temperature differential as previously discussed, and a second pointer 18B indicates ambient temperature. Ambient temperature may be detected from either of the sensors 12A or 12B or by a combination of both detectors in an arrangement wherein the temperatures are averaged. Ambient temperature may be detected by a third sensor (not shown) mounted to the glider. The function of the instrument 18 of FIG. 3 is to provide to the pilot both an indication of temperature differential and indication of the air temperature in which the glider is passing.

In addition to the apparatus for detecting temperature differential to the right and left of the glider as has been described, FIG. 1 includes means for indicating temperature differential fore and aft of the glider. A forward air temperature sensor 42 is mounted at the forward periphery of the glider and a rearward air temperature sensor 44 is mounted at the rearward periphery of the glider. Sensors 42 and 44 are connected to a temperature differential indicator means 46. The sensors 42 and 44 and differential indicator 46 function in the same way, using the same type of circuit arrangements, as has been described with reference to sensors 12 and 14 and indicating instrument 18. Indicator 46 signals the glider pilot when a temperature differential is detected between the forward versus the rearward end of the aircraft. This indication signals the pilot when the glider is entering or leaving warmer air.

FIG. 4 illustrates one instrument arrangement for utilizing both left-right and fore-aft indicators. Left and right indicating lights 20A and 20B function as previously described. Forward light 48A and rearward light 48B operate in the same manner, but to indicate a fore and aft temperature differential. Thus, if lights 20A and 48A are on the pilot knows that he is moving into warmer air, and that the warmest air is to the left of the glider. If lights 20B and 48B are on the pilot knows he is moving away from warmer air and that the warmest air is to the right. If only light 48A is on the glider is moving directly into warmer air, and if only light 48B is on the glider is moving directly out of warmer air. The ambient temperature indicator 18B indicates, as with the arrangement of FIG. 3, the general temperature of the air.

FIG. 4 is only representative of one arrangement for combining left-right and fore-aft indication. Many other devices may be utilized within the scope of the invention. Obviously, flashes and audio indicators may be used with the arrangement of FIG. 4 if desired.

While the invention has been described with a certain degree of particularity, it is manifest that many changes may be made in the details of construction and the arrangement of components without departing from the spirit and scope of this disclosure. It is understood that the invention is not limited to the exemplary embodiments illustrated herein, but is to be limited only by the scope of the attached claim or cliams, including the full range of equivalency to which each element is entitled.

What is claimed is:

1. Apparatus for mounting in a glider comprising:
   a first air temperature sensor positioned adjacent one point on the perimeter of the glider;
   a second air temperature sensor positioned adjacent a point on the perimeter of the glider opposite said first air temperature sensor;
   a first light and a second light in the glider cockpit in pilot view, the said lights being oriented in the cockpit in accordance with the relative position of the respective sensors; and
   a temperature differential detecting menas is electrically connected in a circuit to said air temperature sensors for indicating the temperature difference between first and second sensors, said first light and said second light operably connected in the circuits to means operable for selectively flashing said first and second lights to indicate a difference in air temperature detected by the individual sensors.

2. Apparatus for mounting in a glider according to claim 1 including means with said indicating means of indicating the ambient air temperature surrounding the glider in addition to said means of indicating temperature differential.

3. Apparatus for mounting in a glider according to claim 1 including audio means operably connected to said temperature differential indicating means for sounding a signal when a temperature differential is detected by the sensors.

4. Apparatus for mounting in a glider according to claim 1 wherein said first air temperature sensor is positioned adjacent the tip of the glider left wing and the second air temperature sensor is positioned adjacent the tip of the glider right wing.

5. Apparatus for mounting in a glider according to claim 1 wherein said first air temperature sensor is positioned adjacent the rearward end of the glider and wherein said second air temperature sensor is positioned adjacent the forward end of the glider.

6. Apparatus in a glider comprising:
a first air temperature sensor positioned adjacent the tip of the glider left wing;
a second air temperature sensor positioned adjacent the tip of the glider right wing, said first and second sensors connected to first and second lights, respectively, in the glider cockpit;
a third air temperature sensor positioned adjacent the rearward end of the glider;
a fourth temperature sensor positioned adjacent the forward end of the glider, said third and fourth sensors connected to third and fourth lights, respectively, in the glider cockpit;
a first temperature differential detecting means mounted in the glider cockpit in pilot view, the differential indicating means being electrically connected in an electrical circuit to said first and second air temperature sensors and to first selective flashing light means for indicating a difference in the temperature detected by said sensors; and
a second differential temperature indicating means mounted in the glider cockpit in pilot view, the second differential means being electrically connected in a second circuit to said third and fourth air temperature sensors and to second selective flashing light means for indicating a difference in temperatures detected by said third and fourth sensors.

* * * * *